Dec. 25, 1945. W. F. PIOCH ET AL 2,391,511
MACHINE TOOL FOR MANUFACTURING AIRCRAFT WINGS
Filed May 13, 1944 3 Sheets-Sheet 3

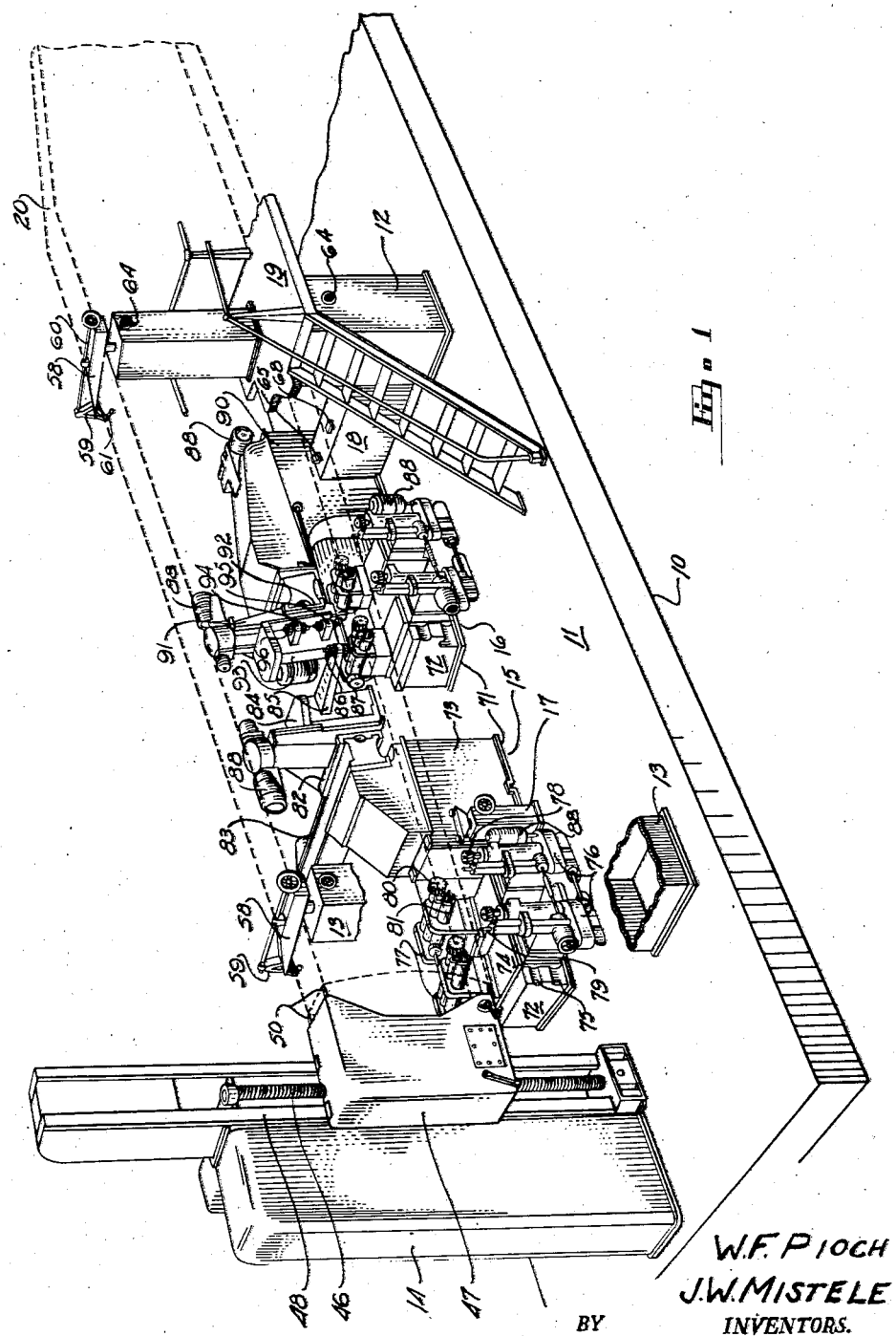

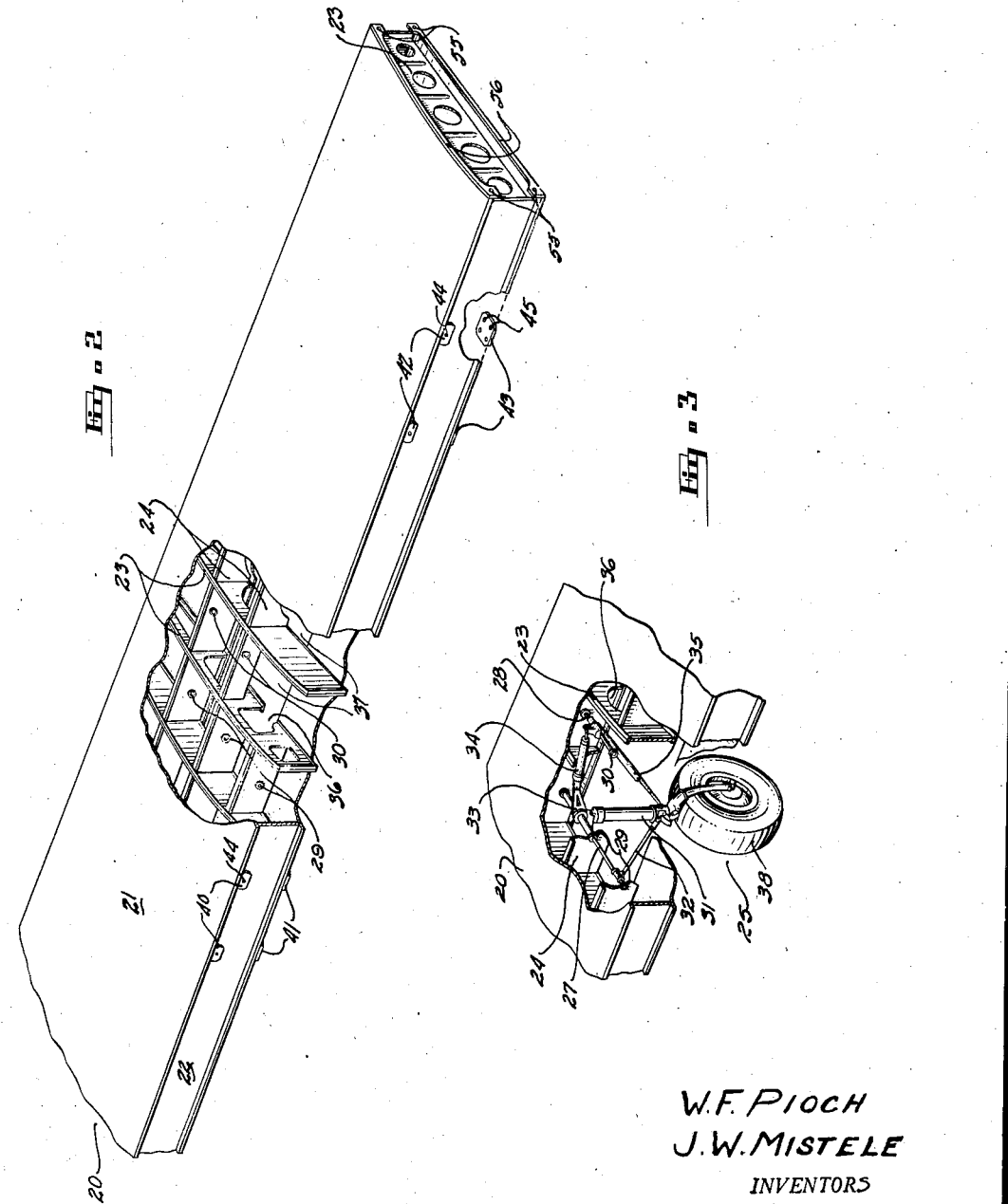

W. F. PIOCH
J. W. MISTELE
INVENTOR.

Patented Dec. 25, 1945

2,391,511

UNITED STATES PATENT OFFICE 2,391,511

MACHINE TOOL FOR MANUFACTURING AIRCRAFT WINGS

William F. Pioch and John W. Mistele, Detroit, Mich., assignors to Ford Motor Company, Dearborn, Mich., a corporation of Delaware Application May 13, 1944, Serial No. 535,428

8 Claims. (Cl. 29—33)

This invention relates to machine tools and manufacturing processes; and, more particularly, to a multipurpose tool which is advantageous in the machining of co-ordinated elements of aircraft wings.

The purpose of this invention is to devise a multipurpose tool (referred to herein as a "milling machine," although it performs other operations as well) in which the wing of an aircraft can be received in its substantial entirety and in which the numerous co-ordinated elements requiring further machining can be finished with a high degree of individual and interrelated accuracy. Thus, the wing chosen as an example is a part of a four-engine heavy bomber. The wing, which is a continuous unitary structure extending through the aircraft fuselage, supports the four engines and the aircraft's landing gear. These components are releasably attached to suitable forgings which form an integral part of the wing fabric. In work of this scale, these points of attachment are separated by considerable distances (as high as 60 feet) and their attaching surfaces are located in different and oblique planes. Nevertheless, it is necessary not only that these individual points be finished to a high degree of accuracy per se, but also that each point (and there are a plurality of such points for the attachment of each separate component) be precisely related to the other points for the particular component and to the groups used in attaching the other components.

Thus, in the present instance, there are—basically—four engine attachment groups, each including four engine mounting pad forgings and two landing gear groups, each comprising five bushing forgings. Each pad and bushing requires a number of separate finishing operations, including milling, drilling, boring, reaming and spot facing. Individually, these elements can be handled without particular difficulty by conventional techniques. However, these elements represent the points of application of the principal forces imposed on the fabric. The wing structure has been carefully designed to withstand these forces when they are applied according to the design but are correspondingly less efficient when they are not applied, in location or sense, according to the stress analysis. This results, at the least, in localized deflection or distortion, which reduces the strength of the structure, encourages undue vibration and, most seriously in the case of the landing gear mountings, may result in binding, impeding the free movement of the parts. This last consideration is of prime importance for, obviously, failure of the landing gear retraction mechanism will inevitably result in damage or even destruction of the craft.

Those skilled in the art recognize that an aircraft wing is far from a rigid structure; and, in fact, must have a high degree of resiliency to withstand the varying forces imposed. Consequently, the major loads represented by the engines and landing gear cannot be treated as independent entities. Consequently, the fabric is designed so that under all conditions, vibration and stresses will be kept to a practical minimum and the unimpeded operation of movable elements insured. This, in turn, requires a nice maintenance of the interrelationship between the several elements which is obtainable only if over-all accuracy is obtained. In this respect the conventional technique is of little value. First, the wing section may be as much as 100 feet in length and weigh many tons, so it is difficult to move and set up on individual machine tools. Second, the distance between different groups is of such magnitude that measurement with the requisite accuracy is next to impossible. Third, the time required for a number of successive setups is out of reason as compared with the actual time spent in machining, representing a direct waste of tool capacity and skilled labor. Fourth, it is impossible to provide an integrated support of the wing in each successive setup; so deflection occurring during the separate machining steps contributes to accuracy. Fifth, the total time required to complete the operation as well as may be done with the methods heretofore used, is measured in hundreds of hours; the time spent in using the present apparatus is substantially less than one hour and the results are uniform from assembly to assembly and accurate per se, distortion is avoided even from the effects of differing temperatures, which are inevitable when the machining process extends over several days.

The present invention comprehends a single machine tool in which the entire wing section is received and fixedly supported. All the machining operations are then performed without shifting the wing from the original setup. These operations may be performed concurrently and since, in effect, each individual setup is permanent, accuracy is maintained throughout.

With this and other considerations in view, the invention consists of the details of the apparatus and the steps of the method which are disclosed in the specification, claimed in the claims, and illustrated in the accompanying drawings in which:

Figure 1 is a perspective view of one longitudinal half of the device of this invention, the wing section to be machined is indicated in phantom and shown being lowered into position.

Figure 2 is a perspective view of a longitudinal half of the wing section showing the engine attaching pads and the landing gear bushings.

Figure 3 is a further detail of the wing showing the landing gear installation.

Figure 4:
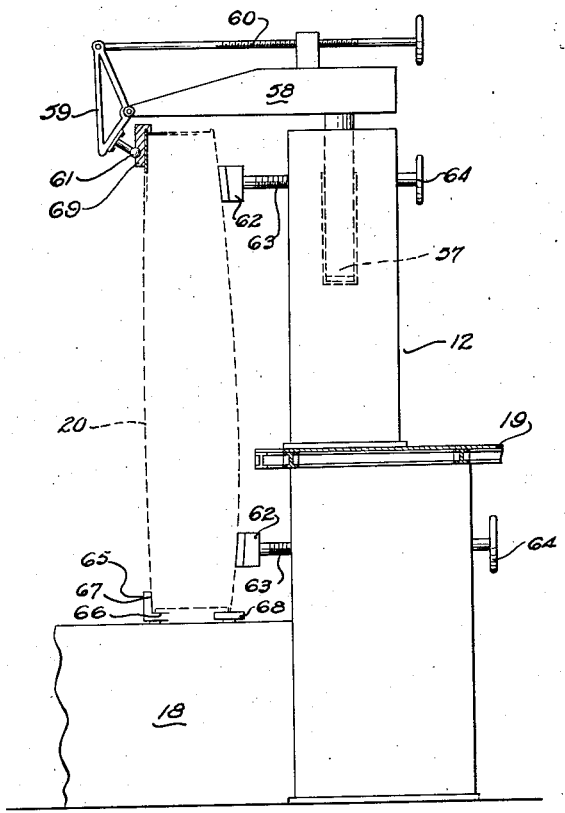
Figure 4 is a side elevation of one of the center towers of the device.

Referring to Figure 1, 10 indicates, generally, a milling machine having a continuous base 11 to which are secured the center towers 12, intermediate towers 13 and end towers 14. Since only half of the device is shown, as it is longitudinally symmetrical, but one of each of these towers is indicated, and a large part of the intermediate tower 13 is broken away to show the mechanism behind it. In addition, the base supports four separate machine tool batteries, generally indicated as 15 for the outboard and 16 for the inboard batteries, two outer wing support columns 17 and two center wing support columns 18 connected to the center towers 12. A platform 19 extends between the several towers to permit ready inspection of the upper part of the wing.

The wing section 20 to be machined is shown in phantom in Figures 1 and 4 and in some details in Figures 2 and 3. It is of conventional structure having the skin 21 and spars 22, transverse bulkheads 23 and several longitudinal webs 24 adjacent that portion of the wing in which the landing gear 25 is retracted. The longitudinal stringers supporting the skin are omitted from the showing in the interest of clarity. The bushings which support the landing gear support shafts 27 and 28 are attached to and extend through these webs and are arranged in two transverse alignments—three at 29 for the inboard shaft 27 and two at 30 for the outboard shaft 28. The shock strut 31, brace 32 and actuating cylinder anchor 33 are secured to the inboard shaft 27. The actuating cylinder 34 and actuating link 35 are mounted on the outboard shaft 28. It will be noted that certain of the bulkheads 23 are cut away as at 36, and a large aperture 37 is formed in the lower skin, so the wheel 38 may be retracted to the interior of the wing. Reference to copending applications, Serial Nos. 463,267 and 487,279 will clarify the construction.

In addition to these ten bushings 29 and 30, which are located interiorly of the wing, there are four attachment pads for each engine mount identified as the upper inboard pads 40, lower inboard pads 41, upper outboard pads 42 and lower outboard pads 43. Each pad is a forging which has been permanently secured as a part of the wing fabric. The upper pads have a single bolt hole 44, while the lower pads each have four bolt holes 45. Each of these holes (40 in all) must be drilled and reamed. In addition, the faces of each pad (16 in number) must be milled. Finally, 10 landing gear bushings must be bored and spot-faced. All these surfaces must be finished in precise inter-relationship even though some are located on the leading edge of the wing section (in different parallel planes), others on the lower skin (in planes normal to the above), and the remainder are obliquely arranged in the interior of the wing.

Figure 5:
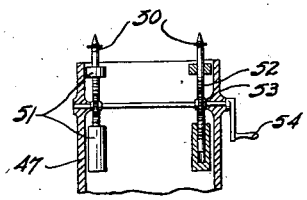
Figure 5 is a detail of the wing piloting means incorporated in the end towers of the device.

Returning to Figure 1, the end towers 14 have a vertically mounted rotatable screw 46 engaging the end carriage 47, slidably mounted in the gibs 48. Conventional drive means (not shown) provide controlled rotation of the screw 46 and consequent vertical displacement of the carriage 47. As shown in detail in Figure 5, pairs of pins 50 are slidably mounted at the top and bottom of the carriage in bushings 51 and have a rack 52 meshing with a pinion 53, driven by the crank 54. These pins 50 are so located that they will engage the holes 55 at the corners of the wing-tip attaching angle 56 at the outer ends of the wing section and support and pilot the section on the end carriages 47. Before placing the wing section 20 in the machine, the carriages 47 are run to the top of the screw 46. The wing is then lowered between the two carriages and aligned with them. The crank 54 is then operated advancing the pins 50 and locking the wing section securely between the two end carriages.

The center towers 12 and intermediate towers 13 are essentially similar in construction. Each (see Figure 4) has a hydraulic plunger 57 at the top to which is secured an arm 58, the assembly being swingable about the vertical axis of the plunger, so the arm may swing aside to clear the wing section 20 as it is placed or removed. At the outer end of the arm 58, a lever 59 is pivoted intermediate its ends—one of which is attached to the threaded control rod 60 and the other of which (in the case of the center towers) has a ball locater 61. The towers also support an upper and lower clamping blocks 62 on the threaded rods 63, which traverse the tower and are operated by the handwheels 64. In conjunction with the center towers, a center wing support column 18 extends transversely under the space to be occupied by the wing. This has an angle 65 rigidly set, so its base 66 conforms to the lower leading edge of the wing section when properly set up for machining and its leg 76 similarly defines the lower skin surface. A plate 68, level with the base 66, supports the upper leading edge of the section.

As described in the copending applications referred to above, the pilot sockets 69 are attached to the wing section in the process of manufacture and serve thereafter to position the wing on assembly bucks through the fuselage assembly steps, as shown in copending application Serial No. 463,266 and the application for Mating fixture filed herewith. These serve as the sole support for the wing through the fuselage assembly stages and the retaining forces applied on them in this milling machine will duplicate those obtaining on the mating bucks. The wing will be subject to the same deflection in each case. Accordingly, after the wing section has been engaged between the end carriages 47, these are lowered until the bottom leading edge of the wing is seated in the angle 65, as shown in Figure 4. The lower clamping blocks 62 are then advanced to hold it in place. The arms 58 are then swung over the wing section and lowered until the ball locaters 61 are seated in the sockets 69. The control rods 60 are then adjusted until the upper leading edge of the section rests securely on the plates 68, and on tightening the upper clamping blocks 62 the whole wing section is locked in a predetermined position having selected deflection characteristics. The same procedure is then followed at the intermediate towers 13, but here the purpose is not so much to pilot the section as to provide an auxiliary support between the prime locating points at 47 and 18. The outer wing support columns 17 are provided as a safety measure to prevent the end carriages being lowered too far and overstressing the section in the long span between 47 and 18. The wing section is now set up for the machining operations.

Attention is now directed to the tool batteries 15 and 16 shown in Figure 1. Each includes a base 71 having a low section 72 and a high section 73. A carriage 74 is mounted on the section 72 in the slideways 75 for limited longitudinal movement and carries a pair of integrated vertical slides 76 and a pair of horizontal slides 77. Each vertical slide 76 drivingly supports an end mill 78 and a combined drill and reamer 79 designed to face an upper pad 40 or 42 and finish the bolt hole 44. Each horizontal slide 77 drivingly supports another end mill 80 and a gang of four drill and reamers 81 adapted to face a lower pad 41 or 43 and finish the bolt holes 45. The carriage 74 moves between two predetermined longitudinal positions, in the first of which the faces of the four pads are milled and, in the second, the bolt holes in the pads are first drilled and then reamed by a further advance of the tool.

The high section 73 of the outboard battery 15 has a carriage 82 mounted on the slideways 83 for transverse movement which supports a vertical slide 84. A tool arm 85 is mounted on the slide 84 and a combined boring tool 86, and end mill 87 is drivingly attached above and below the arm adjacent its end. The transverse travel permits the carriage 82 and associated tool arm 85 to be advanced into the interior of the wing through the aperture 37 until the tool is in vertical alignment with the outboard bushings 30 as governed by a stop at the end of the slideway 83. The slide 84 is then raised until the upper boring tool 86 enters and finishes the rear bushing 30 and continues until the end mill 87 is fed against and faces the inner end surface of the bushing. The slide is then lowered and the same process repeated with the lower tool on the front bushing 30.

The inner battery 16 differs from the outer battery only in the construction of the tools for finishing the landing gear bushings necessitated by the fact that there are three rather than two aligned bushings to be finished. In this case, the high section 70 has a carriage 91 on slideways 92 supporting a vertical slide 93 carrying an upper and a lower tool arm 94 and 95. Similar combined boring and milling tools 96 are drivingly mounted above and below each tool arm. The feeding operation is similar to that described above, except that when the slide 93 is raised, the center and rear bushings 29 are bored and the forward faces of these bushings finished. When the slide is lowered, the forward bushing 29 is bored and the rearward faces of the center and front bushings finished. In either case, after the finishing is completed, the tool arms are centered vertically and withdrawn transversely from within the wing, the arms 58 disengaged and swung into the clear, the clamping blocks 62 released, and the end carriages 47 raised to lift the wing section clear of the machine. It may then be picked up by an overhead crane to continue through subsequent assembly steps.

The construction details of the several milling machines are not shown, since they form no part of this invention apart from the organization disclosed. In the main, these machine tools are built according to standard practice and are, of course, equipped with individual electric motor drives as at 88. The tool heads, per se, on the arms 85, 94 and 95, or 76 and 77, are conventional as to drive and feed. In fact, one of the features of the machine is that it may be readily built up from available standard tool components.

The advantages derived from the use of this machine are twofold: Saving in time of operation and increase in accuracy. Obviously, but one setup is required and this, thanks to the piloting means provided, can be completed in a matter of minutes. Consistent operation has shown that the necessary machining operations can now be done in less than one hundredth the time required with the best prior technique and practice.

The increase in accuracy is not attributable alone to the use of a number of machines mounted on a common base. First, the mode of support so the wing will assume the deflected position it will occupy when secured to the fuselage, insures that the structural relationships are the same. Second, the practice of dividing the machining into separate groups but including common elements between the groups, is also important. Thus, one setup machines one engine mount and a part of the landing gear mounting, while a second setup takes care of the remainder of the landing gear mounting and the other engine mount. Thus, the proper relationships between both engine mounts and the landing gear mounting, is obtained. The principle may, of course, be adapted to other specific constructions as well.

Some changes may be made in the arrangement, construction and combination of the various parts of the improved device, without departing from the spirit of the invention, and it is the intention to cover by the claims such changes as may reasonably be included within the scope thereof.

The invention claimed is:

1. In a machine tool particularly adapted to the finishing of a plurality of separated surfaces on an aircraft wing, comprising, a base, end towers on said base, a carriage on each tower adapted to engage one end of an aircraft wing to be supported between said towers, a pair of intermediate horizontal means on said base spaced on either side of the center of said base and adapted to secure said wing with the chord thereof substantially vertical, means at said horizontal supporting means to impress a force on said wing substantially normal to said chord, a plurality of metal cutting tools mounted on said base intermediate said end towers and said horizontal supporting means, said metal cutting tools including certain cutters mounted for common horizontal movement along the extent of said wing and for independent horizontal transverse movement or independent vertical movement into cutting engagement with said wing, and other cutters mounted for horizontal movement projecting them into the interior of said wing and for vertical movement to engage such other cutters in cutting contact with an internal surface of said wing.

2. In a milling machine particularly adapted to the finishing of a plurality of separated surfaces on an aircraft wing, comprising, a base, end towers on said base, carriages vertically movable on said end towers and adapted to engage the ends of a wing to be supported therebetween with its chord substantially vertical, horizontal supporting means intermediate said end tower and including means to impress a force on said wing supported between said end carriages substantially normal to the chord thereof, a plurality of machine tools mounted on said base intermediate said towers and said horizontal supporting means and including machine tool having horizontal and vertical power cutters adapted to engage and to finish related horizontal and vertical surfaces on the exterior of said wing, certain of said cutters being mounted for common horizontal movement longitudinal of said wing and for independent movement vertically and transversely horizontally for cutting engagement with said surface, and other cutters mounted for horizontal movement to project said cutters into the interior of said wing and for vertical movement thereafter to bring said cutters in cutting contact with an internal surface of said wing.

3. In a milling machine particularly adapted to finishing a plurality of separate surfaces on an aircraft wing including those on the leading edge and the main surface of said wing and other surfaces disposed internally of said wing comprising, a base, a pair of supports at the opposite ends of said base adapted to engage said wing therebetween and supported with its chord substantially perpendicular, horizontal supporting means intermediate said end towers and including means to impress a force substantially normal to said chord, a plurality of machine cutting tools mounted on said base intermediate said end towers, certain of said machine cutting tools being mounted for common movement longitudinally of said wing to perform successive machining operations on said edge and surface portions, other cutting tools mounted for horizontal movement transversely of said wing to be projected into the interior of the wing and then moved vertically therein to finish said internal surfaces to be withdrawn horizontally from within said wing to permit removal thereof from said machine.

4. In a milling machine particularly adapted to the machining of a plurality of separated portions of an aircraft wing, comprising, a base, a pair of end towers on said base, a carriage mounted for vertical movement on each said end tower, one of said carriages adapted to engage each opposite end of an aircraft wing to be supported therebetween with its chord substantially vertical, horizontal supporting means intermediate said towers including means engaging said wing and adapted to impress a force substantially normal to the chord thereof, a plurality of metal cutting machine tools mounted on said base intermediate said end towers and said supporting means, certain of said cutting tools being mounted on said base for common movement longitudinally of said wing to perform successive cutting operations on portions thereof on the edge and surface of said wing, and other cutting means mounted on said base for common movement transversely of said wing and including other cutting tools projectable horizontally into the interior of said wing and thereafter movable vertically to bring said other cutting tools into cutting engagement with internal surfaces on said wing to be finished thereby.

5. In a milling machine particularly adapted to the substantially simultaneous finishing of engine mounting means on the exterior of an aircraft wing and landing gear bushing means in the interior of said wing, comprising, a base, end towers on said base, a carriage mounted for vertical movement on each said end towers, said carriages adapted to engage the opposite ends of a wing to be supported therebetween with its chord substantially vertical, a horizontal supporting means intermediate said end towers adapted to secure said wings in predetermined horizontal positions, means co-operating with said horizontal supporting means to impress a force on said wings substantially normal to the chord thereof, a plurality of machine tools mounted on said base intermediate said end towers and said supporting means, certain of said machine tools being mounted for joint movement longitudinally of said wing to perform successive operations on said engine mounting means, other of said machine tools being mounted for joint horizontal movement transversely of said wing and carrying cutting tools to be inserted into the interior of the said wing to finish said landing gear bushings, said last-named tools being also mounted for vertical movement to engage said tools in cutting engagement with said bushings.

6. In a milling machine particularly adapted to the simultaneous machining of a plurality of surfaces on the exterior and in the interior of an aircraft wing, comprising, a base, a pair of end towers on said base, a carriage mounted on each said end towers for vertical movement, means on said carriage to engage the opposite ends of a wing to be supported therebetween with its chord substantially perpendicular to said base, intermediate supports for said wing comprising a fixed angle to engage horizontally one edge of said wing and a plate level with the horizontal support of said angle to receive the other edge of said wing, an arm rotatably mounted at the top of said supporting means and including pilot means adapted to engage said wing adjacent an opposite edge on the same side as said angle, means on said intermediate support to force said wing into engagement with said angle and said pilot means, a plurality of machine tools fixed to said base intermediate said end towers and said supporting means, certain of said tools being designed to operate on an edge and a surface of said wing, other of said tools being movable horizontally to project into and be withdrawn from the interior of said wing, all said machine tools being interlocked with respect to said supporting means and said end towers to finish said plurality of surfaces in predetermined interrelationship.

7. In a milling machine for an aircraft wing, a base, end towers on said base, means on said end towers securing said wing at opposite ends thereof and supporting it with its chord substantially perpendicular, intermediate supports on said base between said end towers and comprising an angle having a base mounted at predetermined elevation and a leg in predetermined alignment adapted to engage one edge of said wing in predetermined alignment, a horizontal support adapted to slidably receive another edge of said wing adjacent said first edge, an arm pivotally mounted on the top of said intermediate support and including a pilot means at the end thereof to engage an edge of said wing opposite said first edge, and means carried by said supporting means, and engaging a surface opposite that engaged by said pilot means, and said angle to force said wing into engagement with said pilot means and said angle while remaining in contact with said horizontal support.

8. In a milling machine particularly adapted to the milling of finished surfaces on an aircraft wing, comprising, a base, end towers on said base, a carriage movably mounted on each said tower for vertical traverse, means on said carriage to engage opposite ends of said wing to support the same between said towers with its chord substantially perpendicular to said base, a pair of horizontal supports intermediate said end towers adapted to engage the bottom edge of said wing adjacent the longitudinal center thereof in predetermined horizontal position and alignment, horizontally swingable means cooperating with said horizontal support mounted above said wing and having pilot means adapted to engage fixedly one side of said wing, pressure means mounted on said horizontal supports adapted to engage the other side of said wing and exert a force thereon substantially normal to the chord thereof to move said wing into engagement with said pilot means and said alignment means, and a plurality of machine tools arranged on said base intermediate said end towers and comprising cutters adapted to perform successive operations on the edge and surface of said wing, and retractable cutters adapted to be projected into the interior of said wing and finish surfaces located interiorly thereof and withdrawn when said surfaces are machined to permit vertical movement of said wing on said end carriages to remove said wing from said milling machine.

WILLIAM F. PIOCH.
JOHN W. MISTELE.